US010239377B2

(12) United States Patent
Marano

(10) Patent No.: US 10,239,377 B2
(45) Date of Patent: Mar. 26, 2019

(54) VEHICLE WITH THREE OR MORE WHEELS PROVIDED WITH AN ANTI-ROLL STABILISER DEVICE AND ANTI-ROLL CONTROL METHOD OF A VEHICLE HAVING AT LEAST THREE WHEELS

(71) Applicant: PIAGGIO & C. S.p.A., Pontedera, Pisa (IT)

(72) Inventor: Luca Marano, Pisa (IT)

(73) Assignee: PIAGGIO & C. S.p.A., Pontedera, Pisa (IT)

( * ) Notice: Subject to any disclaimer, the term of this patent is extended or adjusted under 35 U.S.C. 154(b) by 132 days.

(21) Appl. No.: 15/326,984

(22) PCT Filed: Jul. 13, 2015

(86) PCT No.: PCT/IB2015/055291
§ 371 (c)(1),
(2) Date: Jan. 17, 2017

(87) PCT Pub. No.: WO2016/009329
PCT Pub. Date: Jan. 21, 2016

(65) Prior Publication Data
US 2017/0210190 A1    Jul. 27, 2017

(30) Foreign Application Priority Data
Jul. 18, 2014   (IT) .............................. PD2014A0195

(51) Int. Cl.
*B62D 49/08* (2006.01)
*B60G 13/16* (2006.01)
(Continued)

(52) U.S. Cl.
CPC .............. *B60G 13/16* (2013.01); *B60G 3/00* (2013.01); *B60G 21/007* (2013.01);
(Continued)

(58) Field of Classification Search
CPC ................. B62D 49/085; B62D 49/08; B60G 2300/122; B60G 2300/45;
(Continued)

(56) References Cited

U.S. PATENT DOCUMENTS 2,126,642 A    8/1938   Jones
2,279,120 A    4/1942   Hurley
(Continued)

FOREIGN PATENT DOCUMENTS

DE    12 14 100 B    4/1966
DE    37 15 128 A1   11/1988
GB    2 438 826 A    12/2007

OTHER PUBLICATIONS

International Search Report and Written Opinion of the International Searching Authority for corresponding International Patent Application No. PCT/IB2015/055291 dated Oct. 27, 2015, 9 pgs.

*Primary Examiner* — Keith J Frisby
(74) *Attorney, Agent, or Firm* — Merchant & Gould P.C.

(57) ABSTRACT

A vehicle with 3 or more wheels includes at least two wheels aligned on the same axis. The vehicle has an intermediate centerline plane between the wheels parallel to a direction of movement, including a mass suspended in relation to the wheels defining a passenger or containment compartment, and two suspension groups kinematically connecting the suspended mass to the two aligned wheels. An anti-roll stabilizer device has at least one compensation mass kinematically connected to the suspended mass via a guide and movable in relation thereto. The anti-roll stabilizer device has a drive of the compensation mass to distance or bring the compensation mass closer to the centerline plane on the side opposite the displacement of a barycenter of the suspended mass with respect to the same centerline plane, to oppose the (Continued)

displacement with respect to the centerline plane of the position of the barycenter of the suspended mass.

17 Claims, 9 Drawing Sheets

(51) Int. Cl.
*B60G 3/00* (2006.01)
*B60G 21/00* (2006.01)
*F16F 15/28* (2006.01)
*F16F 7/10* (2006.01)

(52) U.S. Cl.
CPC .......... *B62D 49/085* (2013.01); *F16F 7/1022* (2013.01); *F16F 15/28* (2013.01); *B60G 2200/142* (2013.01); *B60G 2200/144* (2013.01); *B60G 2200/34* (2013.01); *B60G 2200/46* (2013.01); *B60G 2202/25* (2013.01); *B60G 2202/312* (2013.01); *B60G 2204/128* (2013.01); *B60G 2204/16* (2013.01); *B60G 2204/162* (2013.01); *B60G 2204/20* (2013.01); *B60G 2204/421* (2013.01); *B60G 2204/422* (2013.01); *B60G 2300/122* (2013.01); *B60G 2300/45* (2013.01); *B60G 2800/012* (2013.01)

(58) Field of Classification Search
CPC ...... B60G 2800/012; B60G 2800/0124; B60G 2800/912; B60G 2800/9122; B60G 2800/9123; B60G 2800/9124
USPC ........ 280/755, 5.506, 5.508, 5.509, 124.103, 280/124.106, 124.107
See application file for complete search history.

(56) References Cited

U.S. PATENT DOCUMENTS

| | | | |
|---|---|---|---|
| 2,940,772 A | | 6/1960 | Heiss |
| 3,977,694 A | * | 8/1976 | Nordstrom ......... B60G 17/0162 |
| | | | 105/164 |
| 4,103,920 A | | 8/1978 | Smith |
| 4,161,332 A | | 7/1979 | Ekeborg et al. |
| 6,719,313 B2 | * | 4/2004 | Zadok ................. B60G 15/063 |
| | | | 280/124.103 |
| 2004/0094928 A1 | | 5/2004 | Amanuma |
| 2010/0327569 A1 | | 12/2010 | Bourn |

* cited by examiner

VEHICLE WITH THREE OR MORE WHEELS PROVIDED WITH AN ANTI-ROLL STABILISER DEVICE AND ANTI-ROLL CONTROL METHOD OF A VEHICLE HAVING AT LEAST THREE WHEELS

This application is a National Stage Application of PCT/IB2015/055291, filed 13 Jul. 2015, which claims benefit of Serial No. PD2014A000195, filed 18 Jul. 2014 in Italy and which applications are incorporated herein by reference. To the extent appropriate, a claim of priority is made to each of the above disclosed applications.

FIELD OF APPLICATION

The present invention relates to a vehicle with three or more wheels provided with an anti-roll stabiliser device and a relative anti-roll control method of a vehicle having at least three wheels.

STATE OF THE ART

As is known, three-wheeled vehicles are more sensitive than 4-wheel vehicles of the same size as regards roll-over phenomenon on curves due to centrifugal forces. This is due to the fact that the result of the forces acting on the barycentre can escape more easily from the triangular support perimeter of three-wheeled vehicles than from the square perimeter of a 4-wheeled vehicle. For example, with reference to FIGS. 1a, 1b, 1c it can be seen how the position of the barycentre has a direct influence on the roll-over limit of the vehicle, in particular, the transversal position of the barycentre turns out to be the most sensitive parameter on which to intervene to increase this limit: the roll-over condition occurs at the intersection of the force F acting on the barycentre of the vehicle and said support perimeter. When a vehicle moves along a curved trajectory, the centrifugal force acting on it induces the roll of the suspended body. This roll is vital information for the driver because it enables him to understand when and how to change the speed of the vehicle or its trajectory before roll-over occurs.

Unfortunately, the roll motion also induces a displacement in the transversal direction of the barycentre of the vehicle which makes it approach the outer side of the support perimeter reducing, as a result, the roll-over limit of the vehicle.

As a result, to summarise, the displacement of the suspended body while on the one side useful for providing valid feedback to the driver on the dynamics of the vehicle, warning him of the approaching roll-over limit, on the other accentuates the phenomenon of approaching the roll-over limit condition, de facto reducing the maximum speed of the vehicle on a curve, external conditions being equal. In other words, the more sincerely and readily a vehicle conveys to the driver the approaching roll-over condition, the faster such critical state occurs.

PRESENTATION OF THE INVENTION

To resolve the aforesaid problems, as of today various solutions have been used in the prior art.

For example, the common anti-roll bars (ARB) are used to limit the displacement of the barycentre by limiting the roll angle of the body.

These solutions are not particularly effective however.

Other so-called "tilting" systems act by significantly changing the roll angle so as to move the barycentre of the vehicle towards the inside of the curve (as in a motorcycle). These latter systems are ill-adapted for freight vehicles since the driver, passengers and any cargo roll at an elevated angle together with the body. These solutions are not therefore very comfortable for users.

The need is therefore felt to resolve the drawbacks and limitations mentioned with reference to the prior art.

DESCRIPTION OF THE DRAWINGS

Further characteristics and advantages of the present invention will be more clearly comprehensible from the description given below of its preferred and non-limiting embodiments, wherein.

The elements or parts of elements common to the embodiments described below will be indicated using the same reference numerals.

DETAILED DESCRIPTION

Figure 1A:
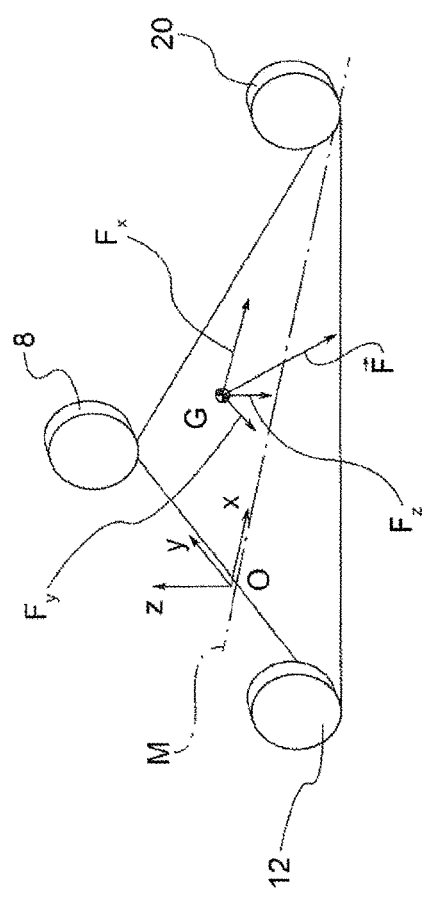
FIGS. 1a, 1b, 1c represent schematic views of a 3-wheeled vehicle of the prior art, and of the influence of the position of the barycentre on the roll-over limit of such vehicle.

With reference to the aforementioned figures, reference numeral 4 globally denotes a schematic overall view of a vehicle with 3 or more wheels, according to the present invention.

In particular, the vehicle 4 comprises at least two wheels 8, 12 the centres of which (but not the respective axes) are longitudinally aligned with an axis 16, and has an intermediate centreline plane M-M between said wheels 8, 12 aligned and parallel to a direction of movement X-X. The aligned wheels are transversally distanced by a distance or lane 't' (FIGS. 1b, 1c).

It is also possible to define a transversal direction Y-Y, perpendicular to the direction of movement X-X and substantially parallel to said axis 16, as well as a vertical direction Z-Z perpendicular to the direction of movement X-X and transversal direction Y-Y and perpendicular to a ground plane P of the vehicle 4.

For the purposes of the present invention, it should be pointed out that the term vehicle or motor vehicle should be considered in a broad sense, encompassing any motor cycle having at least two aligned wheels 8, 12 preferably rear and at least one front wheel 20. The definition of vehicle thus also comprises so-called quads, having two wheels on the front and two wheels at the rear; as seen in the introduction this invention is specifically, but not exclusively, aimed at applications on 3-wheeled vehicles in that on those vehicles, the phenomenon of roll-over is particularly critical.

Figure 1C:
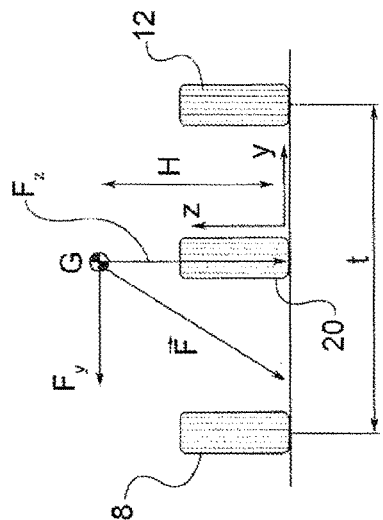
Figure 1B:
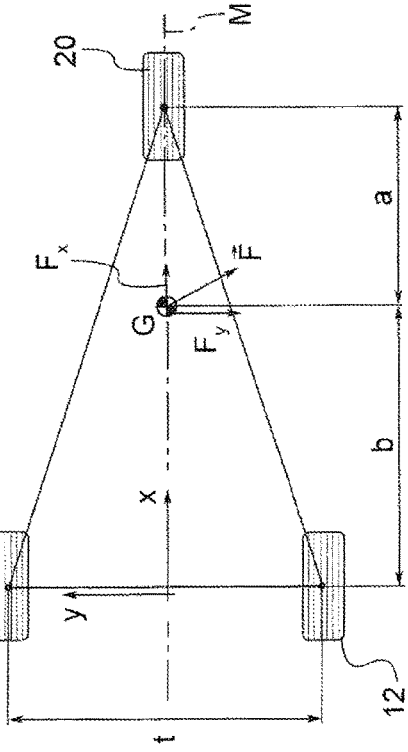

FIGS. 1a, 1b, 1c give a schematic picture of this technical problem with particular reference to the application of the dynamic forces Fx, Fy, Fz directed along their directions of movement, transversal and vertical, so as to give the resulting force F, and applied to a barycentre G of the vehicle. The barycentre G can also be defined by the distances respectively 'a' and 'b', from said front wheel 20 and said axis 16 along the direction of movement X-X (FIG. 1b) and a height or distance H of the barycentre G from the ground plane P of the vehicle may also be defined.

The vehicle 4 comprises at least one mass 24 suspended in relation to said wheels 8, 12 defining a passenger compartment or containment compartment of the vehicle.

Preferably, the centreline plane M-M is a centreline plane of the passenger compartment or suspended mass 24 of the vehicle 4.

Typically the suspended mass 24 comprises all the elements which transfer their weight onto the ground plane P by means of elastic suspension elements and therefore in this case the vehicle chassis 4 or even, in the case of commercial or transport vehicles, a load area for the transport of goods.

The vehicle 4 further comprises two suspension groups 28, 32 kinematically connecting the suspended mass 24 to said two aligned wheels 8, 12.

For the purposes of the present invention, different types of suspension groups may be provided.

For example, according to one embodiment (FIGS. 3a, 3b, 4a, 4b, 5a, 5b), the suspension groups 28, 32 comprise articulated quadrilaterals having at least a lower oscillating arm 36 and at least an upper oscillating arm 40 each connected to a respective aligned wheel 8, 12.

According to a further embodiment of the present invention (FIGS. 6a, 6b, 7a, 7b, 8a, 8b), the suspension groups 28, 32 comprise suspensions of the McPherson type, comprising a lower oscillating arm 36 and an upper upright 44.

Advantageously, the vehicle 4 comprises an anti-roll stabiliser device 48 having at least one compensation mass 52 kinematically connected to the suspended mass 24 via guide means 56 and movable in relation thereto.

Advantageously the anti-roll stabiliser device 48 comprises drive means 60 of the compensation mass 52 so as to distance or bring the compensation mass 52 closer to the centreline plane M-M on the side opposite the displacement of a barycentre G of the suspended mass 24 with respect to said centreline plane M-M, so as to oppose the displacement, with respect to the centreline plane M-M, of the position of said barycentre G of the suspended mass 24.

Figure 2B:
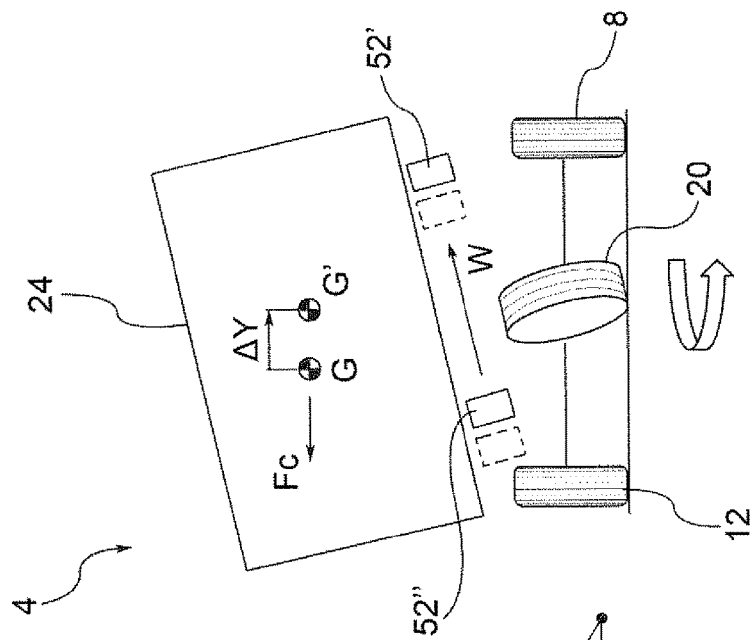
FIGS. 2a-2b are schematic views of the variation of position of the barycentre of a 3-wheeled vehicle according to one embodiment of the present invention, while moving round a curve.
Figure 2A:
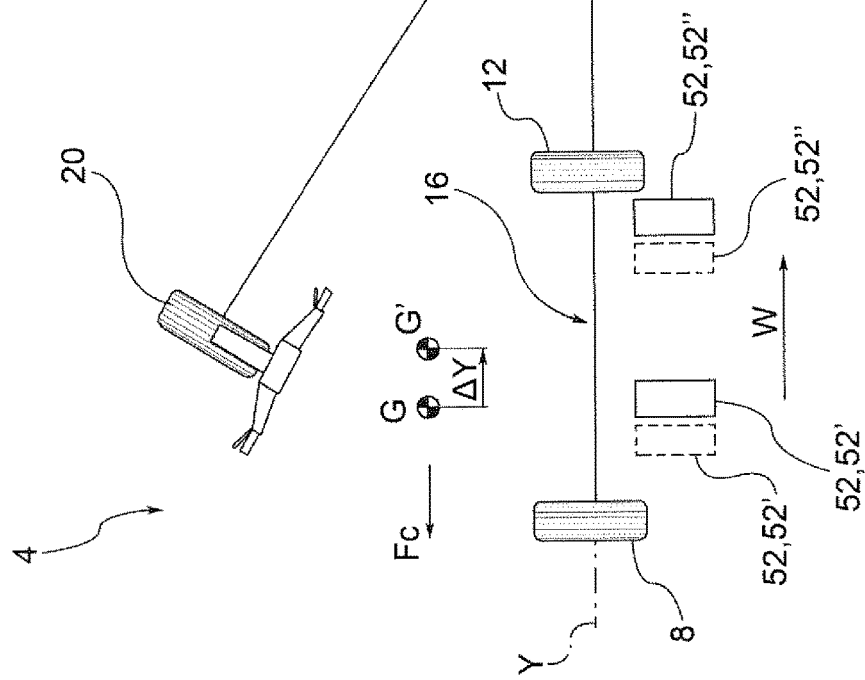
Figure 3A:
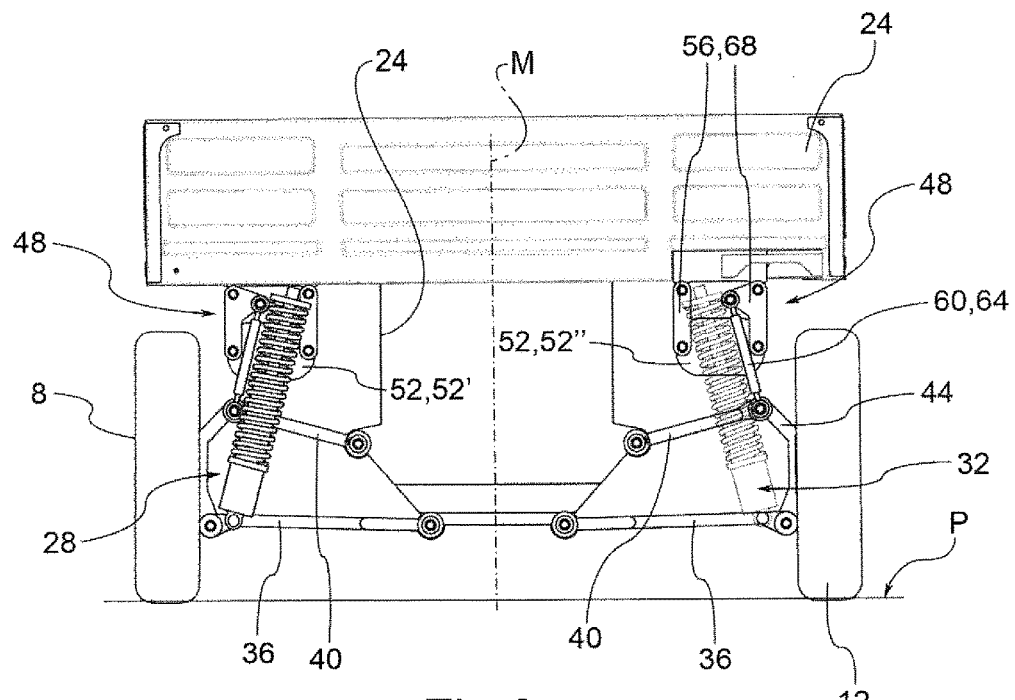
FIGS. 3a-3b respectively show a side view and a plan view from above of a vehicle according to one embodiment of the present invention.
Figure 3B:
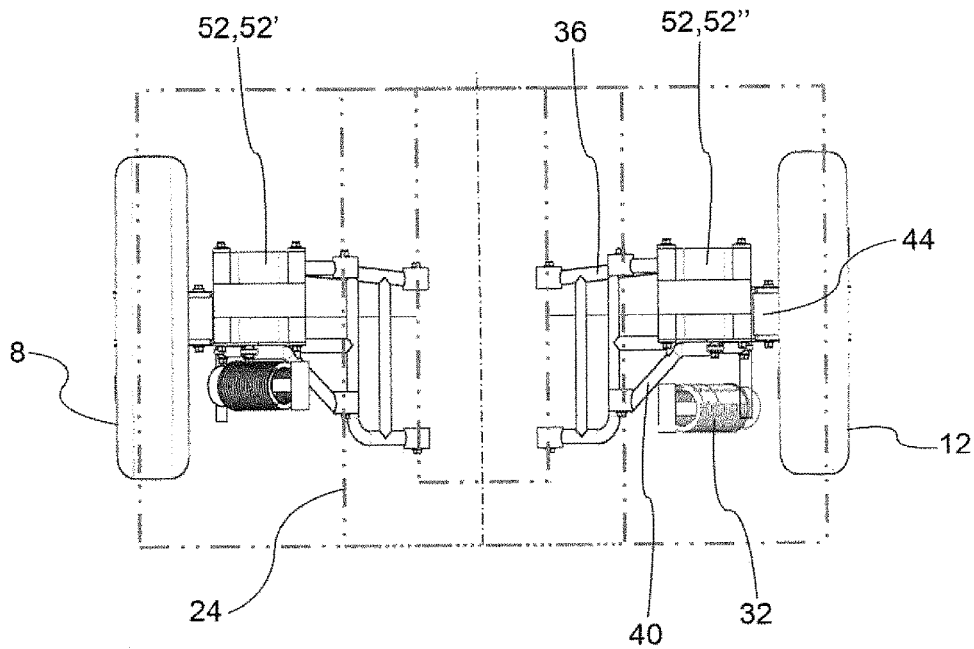

The displacement of the barycentre of the suspended mass is schematized in FIGS. 2a, 2b with the reference ΔY.

Figure 5A:
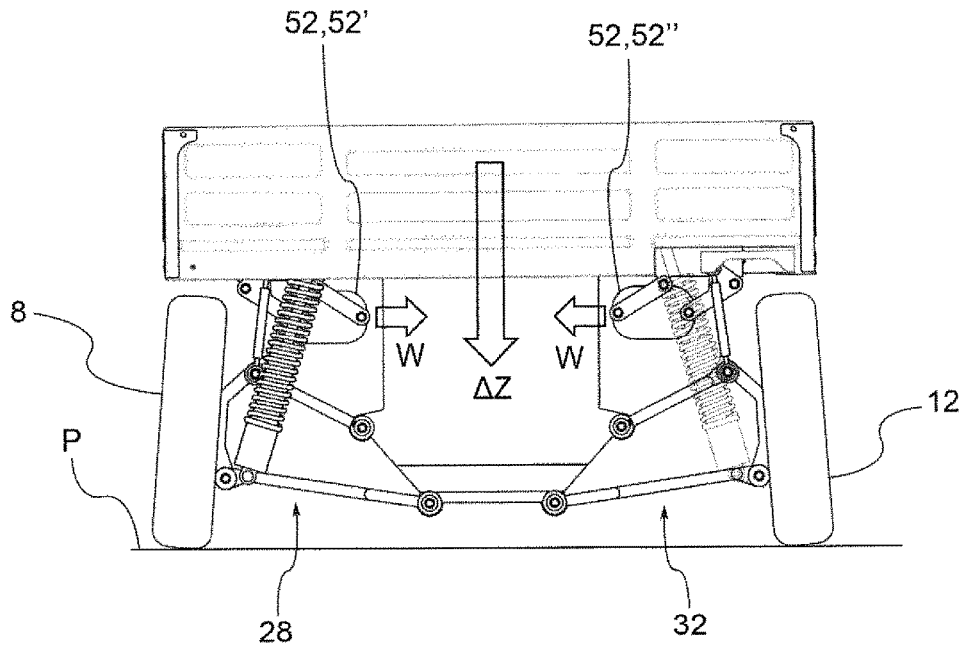
FIGS. 5a-5b are side views of the vehicle in FIGS. 4a-4b, respectively in the compression configuration of the suspension groups and in the extension configuration of the suspension groups.
Figure 5B:
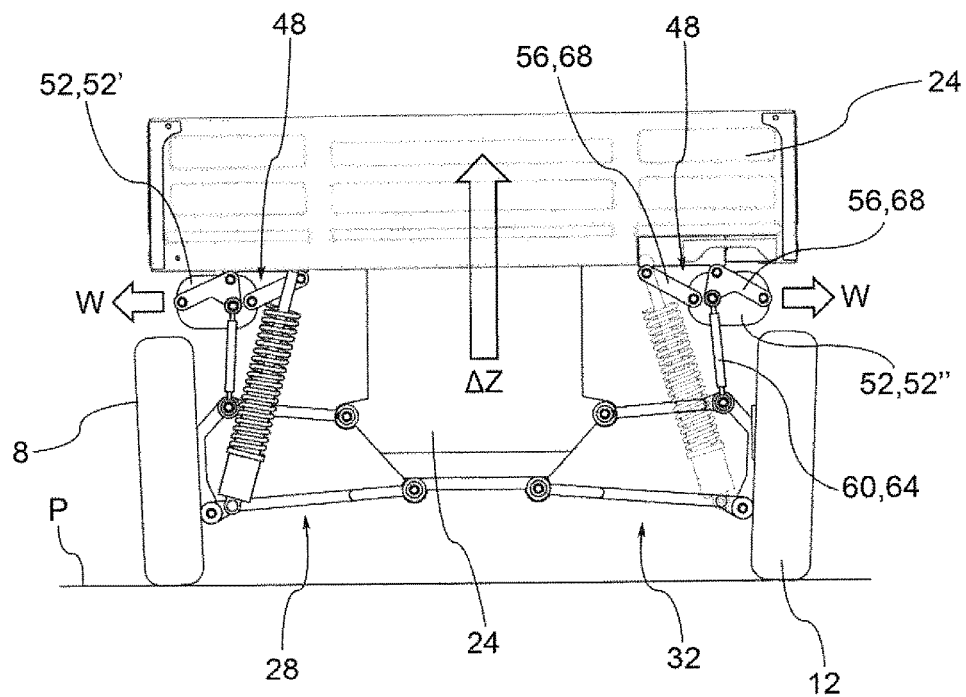
Figure 6A:
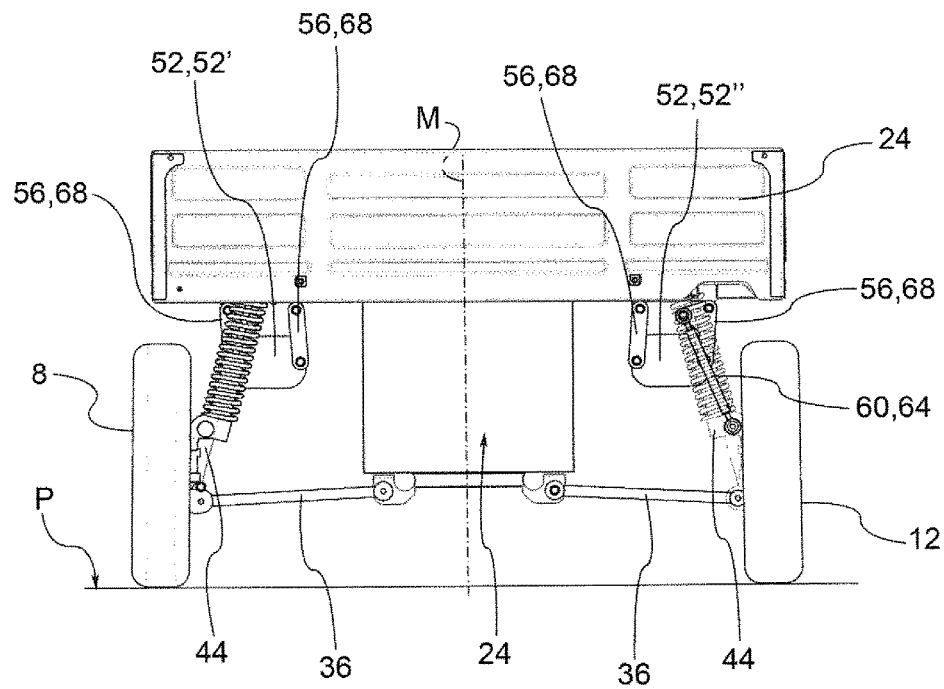
FIGS. 6a-6b respectively show a side view and a plan view from above of a vehicle according to a further embodiment of the present invention.
Figure 6B:
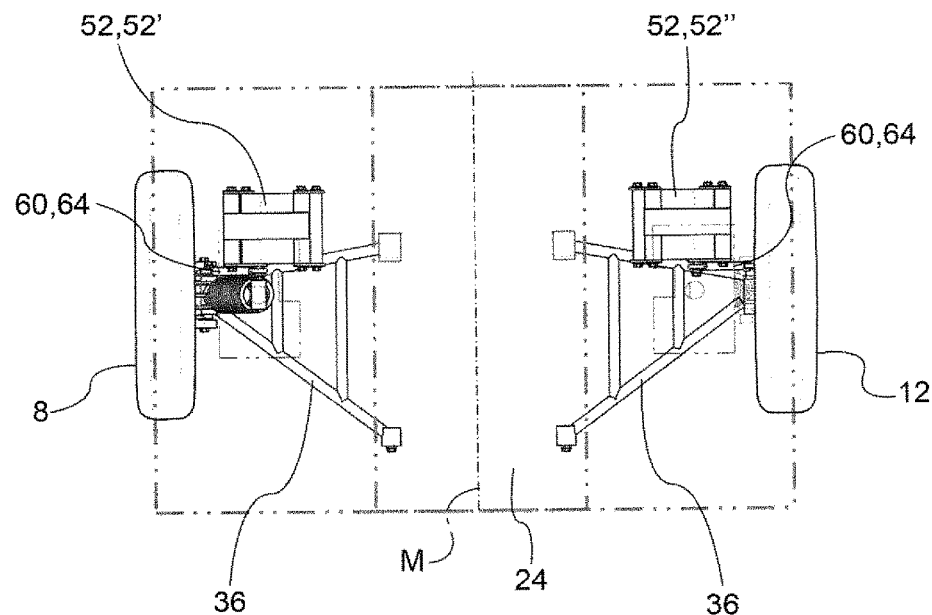
Figure 8A:
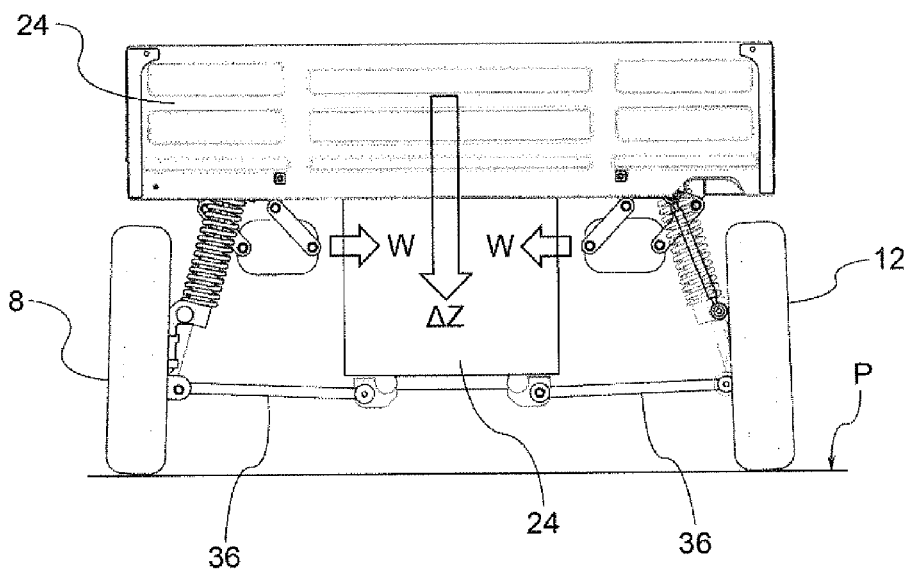
FIGS. 8a-8b are side views of the vehicle in FIGS. 7a-7b, respectively in the compression configuration of the suspension groups and in the extension configuration of the suspension groups.
Figure 8B:
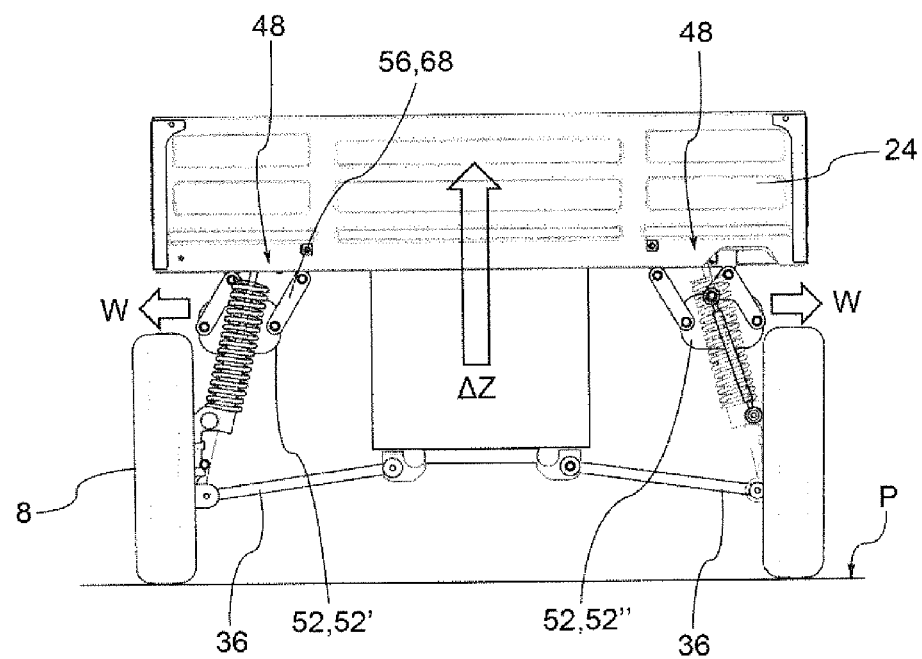
Figure 9:
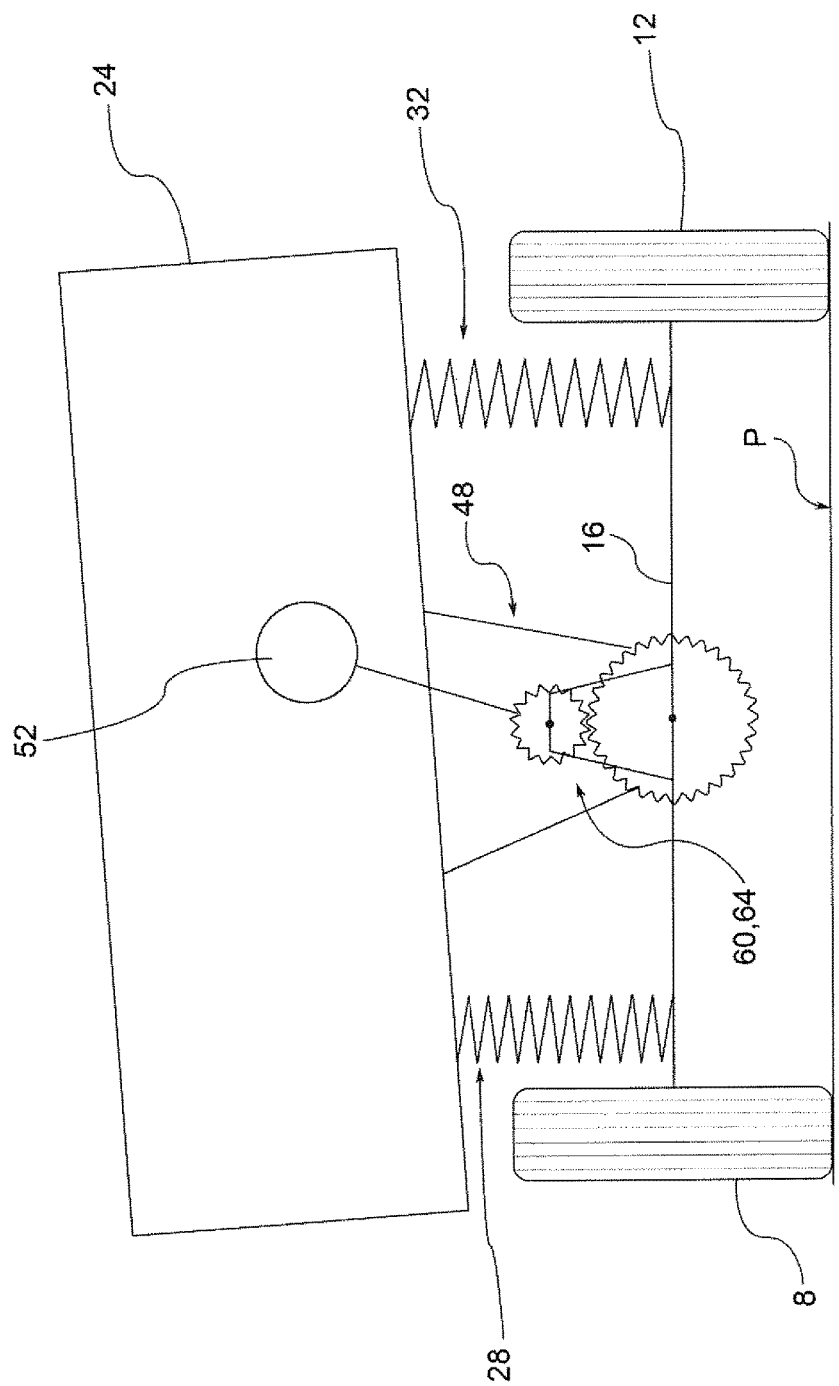
FIG. 9 shows a side view of a vehicle according to a further embodiment of the present invention.

The barycentre G of the suspended mass 24 may also undergo vertical displacements ΔZ, i.e. perpendicular to the ground plane P and parallel to the centreline plane M-M, both lifting it (FIGS. 5b, 8b) or lowering it (FIGS. 5a, 8a).

The displacements of the compensation masses 52, 52', 52" are sketched in the figures with the arrows W.

In particular, the distance of the compensation mass 52 from the centreline plane M-M is measured perpendicular to said centreline plane M-M and to the direction of movement X-X of the vehicle, i.e. parallel to the transversal direction Y-Y.

The drive means 60 move the compensation mass/masses 52 in a transversal direction Y-Y, substantially perpendicular to said centreline plane M-M and to the direction of movement X-X.

According to one embodiment, the drive means 60 comprise at least one connection arm 64 with said suspension groups 28, 32.

Preferably, said connection arm is a connecting rod i.e. a rod doubly hinged at the ends so as to be able to rotate following the extension/compression movement of the suspension groups 28, 32.

For example the drive means 60 comprise lever systems and/or kinematic mechanisms so as to displace the compensation mass 52 depending on the compression or extension movement of the suspension groups 28, 32 of the wheels 8, 12.

Preferably, the vehicle 4 comprises at least two compensation masses 52', 52" kinematically connected to the suspended mass 24 on opposite sides of the centreline plane M-M and movable in relation thereto.

For example, each compensation mass 52 is provided with drive means 60 having a connection arm 64 to a corresponding suspension group 28, 32 so as to distance or bring the corresponding compensation mass 52', 52" closer to the centreline plane M-M as a function of an increase or reduction respectively of the distance between the suspended mass 24 and the corresponding aligned wheel 8, 12.

According to one embodiment, each compensation mass 52', 52" is provided with drive means 60 having a connection arm 64 to a corresponding suspension group 28, 32 wherein said guide means 56 are configured so that each compensation mass 52', 52" moves away from the centreline plane M-M towards the corresponding wheel 8, 12 when the suspension group 28, 32 extends, distancing the suspended mass 24 from said wheel 8, 12.

According to one embodiment, each compensation mass 52', 52" is provided with drive means 60 having a connection arm 64 to a corresponding suspension group 28, 32, said guide means 56 being configured so that each compensation mass 52', 52" approaches the centreline plane M-M, on the side opposite the corresponding wheel 8, 12, when the suspension group 28, 32 is compressed, bringing the suspended mass 24 towards said wheel 8, 12.

As can be seen, the compensation mass 52 is joined to the suspended mass 24 by guide means 56; according to one embodiment said guide means comprise at least one linear guide (not shown), so as to be able to translate relative to the suspended mass 24.

According to a further embodiment, the compensation mass 52 is joined to the suspended mass 24 by guide means 56 comprising at least one connecting rod 68 so as to be able to tilt in relation to the suspended mass 24 or passenger compartment of the vehicle 24.

According to a further embodiment, the at least one compensation mass 52 is joined to the suspended mass 24 by pairs of connecting rods 68 so as to be able to tilt in relation to the suspended mass 24.

Preferably, the guide means 56 guide a tilting movement of the compensation masses 52, 52', 52" according to one or more tilting axes parallel to said direction of movement X-X and the centreline plane M-M.

As seen, the suspension groups 28, 32 may be of various types; for example, in the case of articulated quadrilaterals having at least a lower oscillating arm 36 and at least one upper oscillating arm 40 each connected to a respective aligned wheel 8, 12, the connection arm 64 interfaces with said upper oscillating arm 40.

In the case of use of Mcpherson type suspension groups 28, 32, comprising a lower oscillating arm and an upper upright 44, the connection arm 64 arm preferably interfaces with said upper upright 44.

The compensation masses 52 may be of various types; according to one embodiment said compensation masses 52 comprise power supply batteries for said vehicle. This way there is no need to use additional masses which would worsen the performance and fuel consumption of the vehicle 4.

According to one embodiment, the total value of the compensation mass 52 is equal to at least 10% of the total mass of the vehicle 4. To limit the weight of the compensation mass 52, it is possible to increase its effect by amplifying its displacement, in particular its transversal displacement W, as compared to that of the barycentre G of the suspended mass or passenger compartment 24 of the vehicle, i.e. so that the displacement of the relative barycentres (i.e. of the compensation mass/mass of the passenger compartment) is at least 2:1.

The functioning of the vehicle equipped with an anti-roll stabiliser device according to the present invention will now be described.

In particular, the anti-roll stabiliser device 48 is substantially actuated upon the variation of the position of the barycentre G of the suspended mass 24 in relation to the centreline plane M-M, i.e. as a function of the displacement of the barycentre in a transversal direction Y-Y.

Such displacement of the barycentre from the centreline plane typically occurs when the vehicle moves round a curved trajectory: in this condition, in fact, a centrifugal force Fc acts on the barycentre of the suspended mass which leads to a displacement $\Delta Y$ of the barycentre from a position G to a position G' (FIGS. 2a-2b).

In such conditions due to the centrifugal force Fc applied to said barycentre G, the suspended mass 24 tends to lie down sideways, i.e. roll around a roll axis materialized by the roll centres of the front and rear suspensions. This roll corresponds to the compression of one suspension group 32 and extension of another suspension group 28. This way, thanks to the drive means the movement of the suspended mass 24 is transferred to the compensation masses 52', 52" which can move thanks to their respective guide means 56.

In particular, the compensation masses 52', 52" are moved so as to distance or bring the compensation mass 52', 52" closer to the centreline plane M-M on the side opposite the displacement $\Delta Y$ of a barycentre G of the suspended mass 24 with respect to the same centreline plane M-M, so as to oppose the displacement $\Delta Y$, with respect to the centreline plane M-M, of the position of said barycentre G of the suspended mass 24.

Figure 4A:
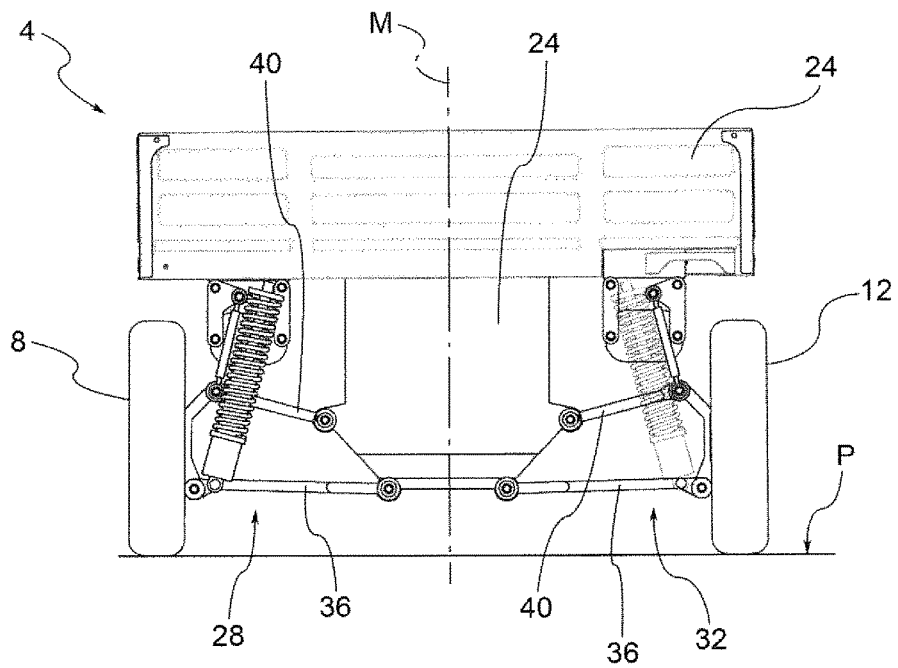
FIGS. 4a-4b are side views of a vehicle according to the present invention, respectively in a rest configuration and while moving round a curve, in which one suspension group is in the compression phase and the other suspension group is in the extension phase.
Figure 4B:
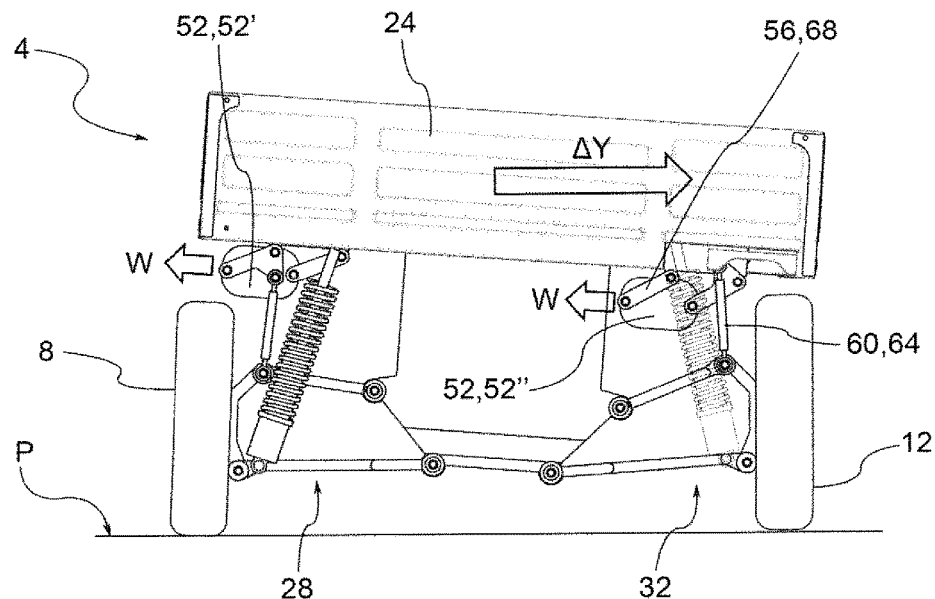
Figure 7A:
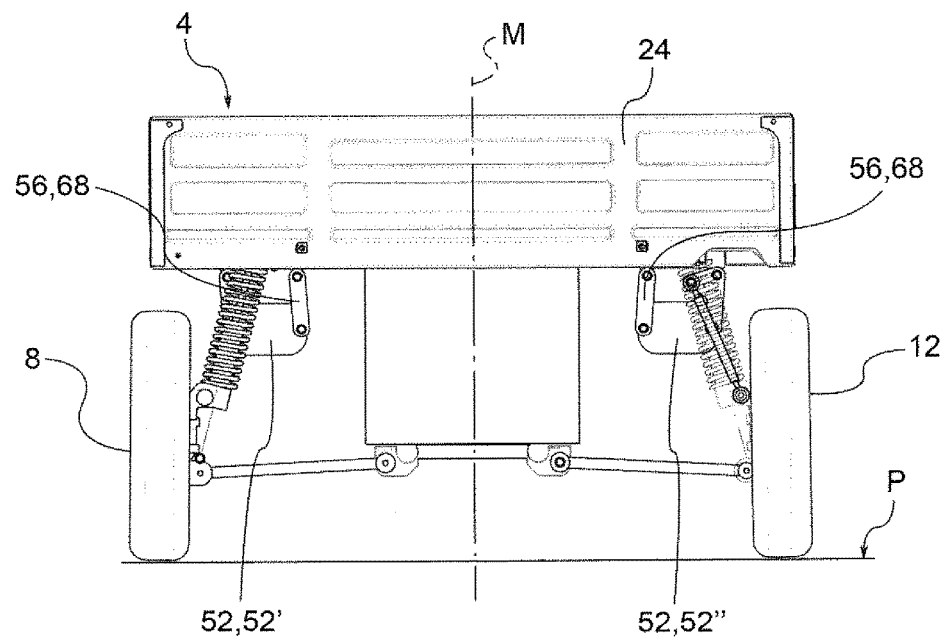
FIGS. 7a-7b are side views of a vehicle according to the present invention, respectively in a rest configuration and while moving round a curve, in which one suspension group is in the compression phase and the other suspension group is in the extension phase.
Figure 7B:
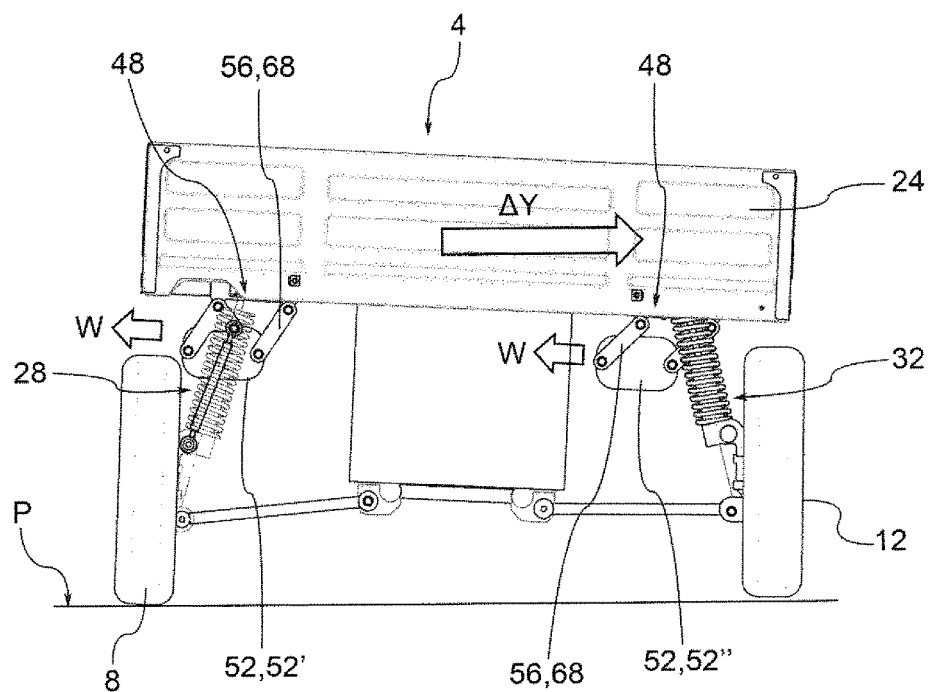

For example, in FIGS. 4b and 7b, relative to a vehicle moving around a curve, it can be seen how upon the displacement $\Delta Y$ of the barycentre G due to the rolling of the suspended mass 24, the suspension group 32, on the outer side of the curve, is compressed, bringing the suspended mass 24 closer to the relative wheel 12, and the compensation mass 52" moves away from the suspension group 32 towards the centreline plane M-M so as to compensate at least partially the displacement $\Delta Y$ of the barycentre G towards the outside of curve.

Moreover, the suspension group 28, on the inner side of the curve, extends, distancing the suspended mass 24 from the relative wheel 8, and the compensation mass 52' moves away from the suspension group 28 and from the centreline plane M-M in order to compensate at least partially the displacement $\Delta Y$ of the barycentre G towards the outside of the curve.

As may be appreciated from the description, the vehicle with three or more wheels provided with an anti-roll stabiliser device according to the invention makes it possible to overcome the drawbacks of the prior art.

In particular, the anti-roll stabiliser device of the vehicle with three wheels according to the invention limits the transversal displacement of the barycentre of the vehicle when cornering, keeping a proper roll angle. This way the driver first of all has feedback on the dynamic behaviour of the vehicle and, at the same time, the vehicle has a higher anti-roll limit due to the limitation of the transversal displacement of the barycentre.

Advantageously, thanks to the present invention it is therefore possible to limit the transversal displacement of the barycentre of a vehicle with 3 or more wheels under the effect of the centrifugal force in a curved trajectory, so as to increase the roll limit of the vehicle making it inherently more stable and safer.

A special feature of the present invention is to limit the transversal displacement of the barycentre on curves maintaining an adequate roll angle needed for the driver to realize how and when to change the speed of the vehicle or its trajectory before roll-over. This type of system is particularly suitable for freight vehicles since the transversal displacement of the barycentre on curves is limited by the appropriate displacement of the internal compensation masses and not by the roll motion of the body towards the inside of the curve.

Advantageously, the compensation masses may even be additional masses of the vehicle, used to optimize the position (including the longitudinal position) of the barycentre. It is also possible to use, as compensation masses, masses already on the vehicle such as for example the batteries of an electrically-powered vehicle, as long as it has the required mass to achieve the desired technical effect. This way it is possible to improve the dynamic behaviour of the three-wheeled vehicle without weighing it down by introducing additional masses.

A person skilled in the art may make numerous modifications and variations to the vehicles and methods devices described above so as to satisfy contingent and specific requirements while remaining within the scope of protection of the invention as defined by the following claims.

The invention claimed is:

1. Vehicle with 3 or more wheels, at least two of the wheels having centres aligned with an axis, the vehicle having an intermediate centreline plane between said wheels aligned and parallel to a direction of movement, the vehicle comprising
    at least one mass suspended in relation to said wheels defining a passenger compartment or containment compartment,
    two suspension groups kinematically connecting the suspended mass to said two aligned wheels;
    an anti-roll stabiliser device having at least one compensation mass kinematically connected to the suspended mass via guide means and movable in relation thereto, wherein the anti-roll stabiliser device comprises drive means of the compensation mass so as to distance or bring the compensation mass closer to the centreline plane on a side opposite displacement of a barycentre of the suspended mass with respect to the centreline plane, so as to oppose the displacement, with respect to the centreline plane, of a position of said barycentre of the suspended mass.

2. Vehicle according to claim 1, wherein a distance of the compensation mass from the centreline plane is measured perpendicular to said centreline plane and the direction of movement of the vehicle.

3. Vehicle according to claim 1, wherein the drive means move at least one compensation mass in a transversal direction, substantially perpendicular to said centreline plane and the direction of movement.

4. Vehicle according to claim 1, wherein said drive means comprise at least one connection arm with said suspension groups.

5. Vehicle according to claim 1, wherein said drive means comprise lever systems and/or kinematic mechanisms to move the compensation mass depending on compression or extension movement of the suspension groups of the wheels.

6. Vehicle according to claim 1, wherein the vehicle comprises at least two compensation masses kinematically connected to the suspended mass on opposite sides to the centreline plane and movable in relation to the centreline plane.

7. Vehicle according to claim 6, wherein each of the compensation masses is provided with drive means having connection arms to a corresponding suspension group to distance or bring the corresponding compensation mass closer to the centreline plane as a function of an increase or reduction respectively of a distance between the suspended mass and the corresponding aligned wheel.

8. Vehicle according to claim 6, wherein each compensation mass is provided with drive means having a connection arm to a corresponding suspension group, said guide means being configured so that each compensation mass moves away from the centreline plane, towards the corresponding wheel when the suspension group extends, distancing the suspended mass from said wheel.

9. Vehicle according to claim 6, wherein each compensation mass is provided with drive means having a connection arm to a corresponding suspension group, said guide means being configured so that each compensation mass approaches the centreline plane, on the side opposite the corresponding wheel, when the suspension group is compressed, bringing the suspended mass towards said wheel.

10. Vehicle according to claim 1, wherein said at least one compensation mass is joined to the suspended mass by guide means comprising at least one connecting rod to tilt in relation to the suspended mass.

11. Vehicle according to claim 1, wherein said at least one compensation mass is joined to the suspended mass by guide means comprising pairs of connecting rods to tilt in relation to the suspended mass.

12. Vehicle according to claim 1, wherein the suspension groups comprise articulated quadrilaterals having at least a lower oscillating arm and at least an upper oscillating arm each connected to a respective aligned wheel, and wherein the drive means comprise a connection arm which interfaces with said upper oscillating arm.

13. Vehicle according to claim 1, wherein the suspension groups comprise McPherson suspensions, comprising a lower oscillating arm and an upper upright, wherein the drive means comprise a connection arm which interfaces with said upper upright.

14. Vehicle according to claim 1, wherein said compensation masses comprise power supply batteries for said vehicle.

15. Vehicle according to claim 1, wherein a total value of the compensation mass is equal to at least 10% of the total mass of the vehicle.

16. Vehicle according to claim 1, wherein the anti-roll stabiliser device is sized so that the ratio between a transversal displacement of the compensation mass and a transversal displacement of the suspended mass is at least 2:1, said transversal displacements being directed in a transversal direction, substantially perpendicular to said centreline plane and to the movement direction.

17. Anti-roll control method of a vehicle having at least three wheels, the method comprising the steps of:
providing a vehicle having 3 or more wheels, of which at least two wheels are aligned with a same axis, the vehicle having an intermediate centreline plane between said wheels aligned and parallel to a direction of movement, the vehicle comprising
at least one mass suspended in relation to said wheels defining a passenger compartment or containment compartment,
two suspension groups kinematically connecting the suspended mass to said two aligned wheels;
fitting the vehicle with an anti-roll stabiliser device having at least one compensation mass kinematically connected to the suspended mass by guide means and movable in relation to the suspended mass;
wherein the anti-roll stabiliser device comprises drive means of the compensation mass so as to distance or bring the compensation mass closer to the centreline plane on a side opposite displacement of a barycentre of the suspended mass with respect to the centreline plane to oppose the displacement with respect to the centreline plane of the position of said barycentre of the suspended mass.

* * * * *